(12) United States Patent
Stenmark et al.

(10) Patent No.: US 7,925,035 B2
(45) Date of Patent: Apr. 12, 2011

(54) SPEAKERBOX

(75) Inventors: Fredrik M. Stenmark, Malmö (SE);
Carl Ståhl, Uppsala (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1405 days.

(21) Appl. No.: 11/399,518

(22) Filed: Apr. 7, 2006

(65) Prior Publication Data
US 2007/0123313 A1 May 31, 2007

Related U.S. Application Data

(60) Provisional application No. 60/740,655, filed on Nov. 30, 2005.

(51) Int. Cl.
*H04R 1/20* (2006.01)
(52) U.S. Cl. .................. 381/345; 381/337; 455/350
(58) Field of Classification Search .......... 381/345–354, 381/423–433; 455/347, 350
See application file for complete search history.

(56) References Cited

U.S. PATENT DOCUMENTS

| | | | |
|---|---|---|---|
| 2,797,766 A | 7/1957 | Sullivan | |
| 3,549,829 A * | 12/1970 | Heidrich | 381/166 |
| 3,554,313 A * | 1/1971 | Young | 181/155 |
| 4,101,736 A | 7/1978 | Czerwinski | |
| 4,356,882 A | 11/1982 | Allen | |
| 4,823,907 A * | 4/1989 | Hoshi | 181/148 |
| 6,381,337 B1 * | 4/2002 | Greenberg | 381/345 |
| 2002/0110258 A1 * | 8/2002 | Pol | 381/423 |
| 2004/0136560 A1 | 7/2004 | Walsh | |

OTHER PUBLICATIONS

PCT Search Report and Written Opinion, Jan. 15, 2007, 11 pages.

* cited by examiner

*Primary Examiner* — Curtis Kuntz
*Assistant Examiner* — Ryan Robinson
(74) *Attorney, Agent, or Firm* — Harrity & Harrity, LLP

(57) ABSTRACT

An electro-acoustic communications unit (20) may include an acoustic driver (22) which, when operated, emits acoustic waves in two directions. A hermetically sealed container (24) attached to the acoustic driver may include a gas other than air. The gas may transport acoustic waves generated by the acoustic driver.

18 Claims, 2 Drawing Sheets

SPEAKERBOX

RELATED APPLICATIONS

This application claims priority under 35 U.S.C. §119 based on U.S. Provisional Application Ser. No. 60/740,655, filed Nov. 30, 2005, the disclosure of which is incorporated herein by reference.

TECHNICAL FIELD OF THE INVENTION

The present invention relates to an electro-acoustic communications unit and a portable electronic device including an electro-acoustic communications unit.

DESCRIPTION OF RELATED ART

A portable electronic device, for instance of the cellular phone type, is normally provided with electro-acoustic elements such as speakers and microphones in order to produce and receive sound.

For a speaker, there is a speaker box or back volume behind the membrane of the speaker. For a cellular phone, this volume is normally decided by air gaps provided between different components and elements of the phone. This means that the back volume cannot readily be designed for the best audio performance as in, for instance, hifi equipment.

In the field of hifi equipment, there have been investigations concerning the use of helium instead of air in such a back volume. The reason that this is done is to avoid resonance caused by the speaker box.

However, it may for some applications be desirable to have a speaker, where the membrane can provide larger strokes/excursions for proving higher sound volumes, especially when playing music. For some applications it may be desirable to provide a more stiff suspension of the speaker element in the phone. This may be desirable if distortion problems are to be avoided as the loudspeaker membrane and suspension would be better balanced, thus lowering the chance for rocking mode distortion phenomenon.

There is thus a need for providing an improved electro-acoustic communications unit that solves at least some of the above mentioned problems.

SUMMARY OF THE INVENTION

The invention is thus directed towards providing an electro-acoustic communications unit which can be used for providing larger strokes or a more stiff suspension of acoustic signal emitting elements of the electro-acoustic communications unit.

This may be achieved through using an acoustic driver, which when operated emits acoustic waves in two directions, to which a hermetically sealed container comprising a gas is attached, where the gas transports acoustic waves generated by the acoustic driver.

Aspects of the invention provide an improved electro-acoustic communications unit, and especially one which can be used for providing larger strokes or a more stiff suspension of an acoustic signal emitting element of the unit.

According to a first aspect of the invention, an electro-acoustic communications unit for mounting in a cellular phone, comprises an acoustic driver, which when operated emits acoustic waves in two directions, and a hermetically sealed container attached to the acoustic driver and comprising a gas other than air, which gas transports acoustic waves generated by the acoustic driver.

A second aspect of the invention is directed towards an electro-acoustic communications unit including the features of the first aspect, wherein the hermetically sealed container has at least one flexible wall, the shape of which will be determined at least partly by elements in the interior of a portable electronic device where the unit is to be mounted.

A third aspect of the invention is directed towards the electro-acoustic communications unit including the features of the first aspect, wherein the acoustic driver comprises an acoustic signal generating element that is attached to the container.

A fourth aspect of the invention is directed towards the electro-acoustic communications unit including the features of the first aspect, wherein a part of the container is an acoustic signal generating element of the acoustic driver.

A fifth aspect of the invention is directed towards the electro-acoustic communications unit including the features of the first aspect, further comprising an absorbent covering the entire hermetically sealed container, except for parts connected to or being part of the acoustic driver.

A sixth aspect of the invention is directed towards the electro-acoustic communications unit including the features of the first aspect, wherein the gas is lighter than air.

A seventh aspect of the invention is directed towards the electro-acoustic communications unit including the features of the sixth aspect, wherein the gas is helium.

An eight aspect of the invention is directed towards the electro-acoustic communications unit including the features of the first aspect, wherein the gas is heavier than air.

A ninth aspect of the invention is directed towards the electro-acoustic communications unit including the features of the first aspect, wherein the container is made of rubber.

Other aspects of the invention provide a portable electronic device that includes an improved electro-acoustic communications unit, and especially one which can be used for providing larger strokes or a more stiff suspension of an acoustic signal emitting element of the unit.

According to a tenth aspect of the invention, a portable electronic device that comprises an electro-acoustic communications unit is provided. The portable electronic device comprises an acoustic driver, which when operated emits acoustic waves in two directions, and a hermetically sealed container attached to the acoustic driver and comprising a gas other than air, where the gas transports acoustic waves generated by the acoustic driver.

An eleventh aspect of the invention is directed towards the portable communication device including the features of the tenth aspect, wherein the hermetically sealed container has at least one flexible wall, the shape of which is determined at least partly by elements in the interior of the portable electronic device.

A twelfth aspect of the invention is directed towards the portable communication device including the features of the tenth aspect, wherein the acoustic driver comprises an acoustic signal generating element that is attached to the container.

A thirteenth aspect of the invention is directed towards the portable communication device including the features of the tenth aspect, wherein a part of the container is an acoustic signal generating element of the acoustic driver.

A fourteenth aspect of the invention is directed towards the portable communication device including the features of the tenth aspect, further comprising an absorbent covering the entire hermetically sealed container, except for parts connected to or being part of the acoustic driver.

A fifteenth aspect of the invention is directed towards the portable communication device including the features of the fourteenth aspect, wherein the gas is lighter than air.

A sixteenth aspect of the invention is directed towards the portable communication device including the features of the fifteenth aspect, wherein the gas is helium.

A seventeenth aspect of the invention is directed towards the portable communication device including the features of the tenth aspect, wherein the gas is heavier than air.

An eighteenth aspect of the invention is directed towards the portable communication device including the features of the tenth aspect, wherein the container is made of rubber.

A nineteenth aspect of the invention is directed towards the portable communication device including the features of the tenth aspect, wherein the device is a portable communication device.

A twentieth aspect of the invention is directed towards the portable communication device including the features of the nineteenth aspect, wherein the device is a cellular phone.

The present invention has a number of advantages. For example, aspects of the invention enable the provision of larger strokes or a more stiff suspension of acoustic signal emitting elements of the electro-acoustic communications unit. The invention according to the second and eleventh aspects furthermore allows the unit to use the available mounting volume provided in a portable electronic device in an effective way. The absorbent according to the fifth and fourteenth aspects furthermore allows the volume occupied by the unit to be better defined and thus the strokes of the acoustic driver may be better controlled as compared to using no absorbent.

It should be emphasized that the term "comprises/comprising" when used in this specification is taken to specify the presence of stated features, integers, steps or components, but does not preclude the presence or addition of one or more other features, integers, steps components or groups thereof.

BRIEF DESCRIPTION OF THE DRAWINGS

The present invention will be more clearly understood from the following description of the present invention, read in conjunction with the attached drawings, where.

DETAILED DESCRIPTION OF THE EMBODIMENTS

The present invention relates to an electro-acoustic communications unit and a portable electronic device including such an electro-acoustic communications unit.

Figure 1:
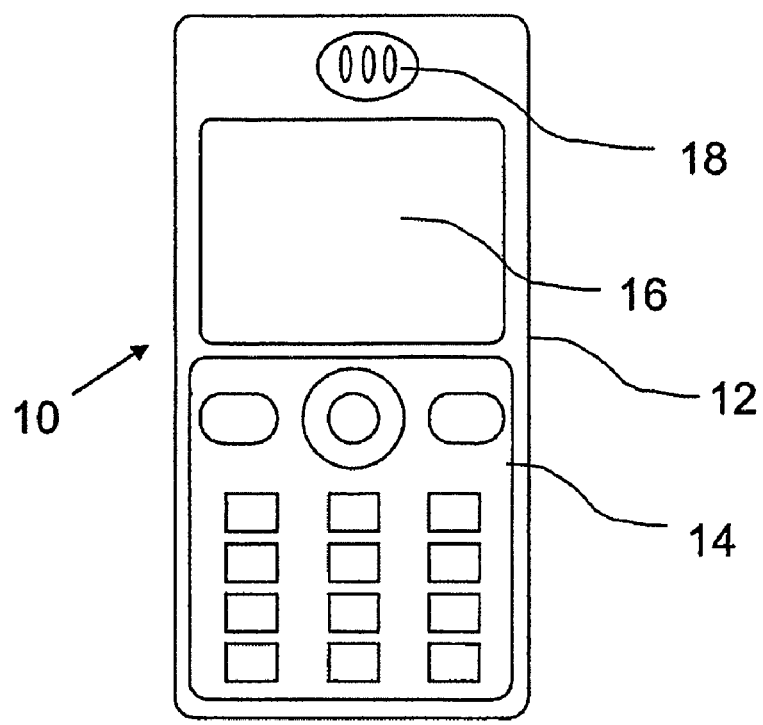
FIG. 1 shows a front-view of a portable electronic device according to the present invention.

FIG. 1 shows a front view of a portable electronic device in the form of a cellular phone 10. The phone 10 has a casing 12 where a keypad 14, a display 16 and a sound opening 18 is provided. Beneath the opening 18 within the casing 12, an electro-acoustic communications unit according to the invention is provided. The portable electronic device 10 is, according to a preferred variation of the present invention, a cellular phone. It should however be realized that the present invention is not limited to cellular phones, but may be provided in other portable communication devices and portable electronic devices like lap top computers, palm top computers, organizers, cordless phones or gaming machines.

Figure 2:
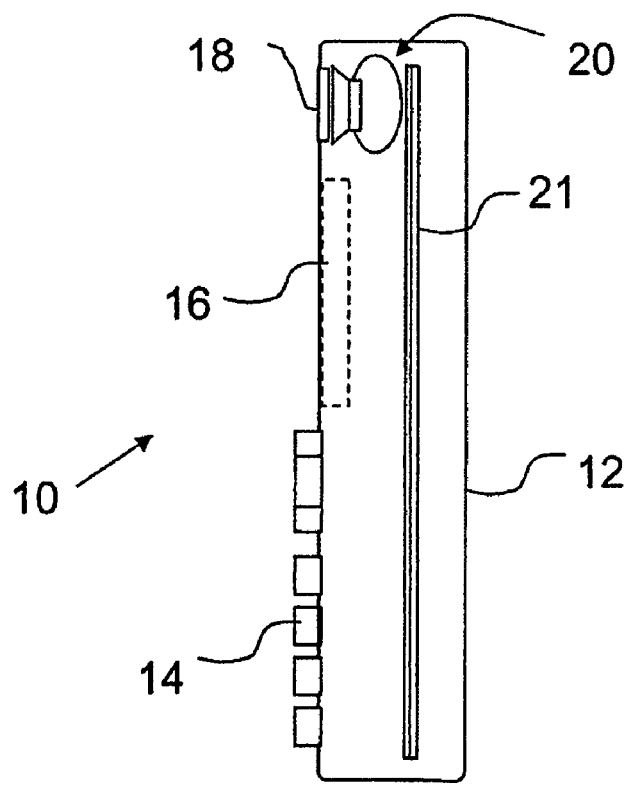
FIG. 2 shows a side-view of the phone in FIG. 1 and comprising an electro-acoustic communications unit according to a first embodiment of the present invention, FIG. 3 schematically shows the electro-acoustic communications unit according to the first embodiment of the present invention, FIG. 4 schematically shows the electro-acoustic communications unit according to a second embodiment of the present invention, and FIG. 5 schematically shows the electro-acoustic communications unit according to a third embodiment of the present invention.

FIG. 2 shows a cross-sectional side view of the phone of FIG. 1. It should here be noted that many elements of the phone 10 have been omitted in order to concentrate on the teachings of the present invention.

In FIG. 2 there is shown the keypad 14 on the casing 12 of the phone 10 and the display 16 just underneath it (shown as a dashed box). Above the display 16, the sound opening 18 is provided. Just underneath this opening 18, there is provided an electro-acoustic communications unit 20 according to the invention. This unit is referred to herein as a speakerbox package. There is here also a circuit board 21 provided underneath the electro-acoustic communications unit 20, the keypad 14 and the display 16, but within the casing 12.

Figure 3:
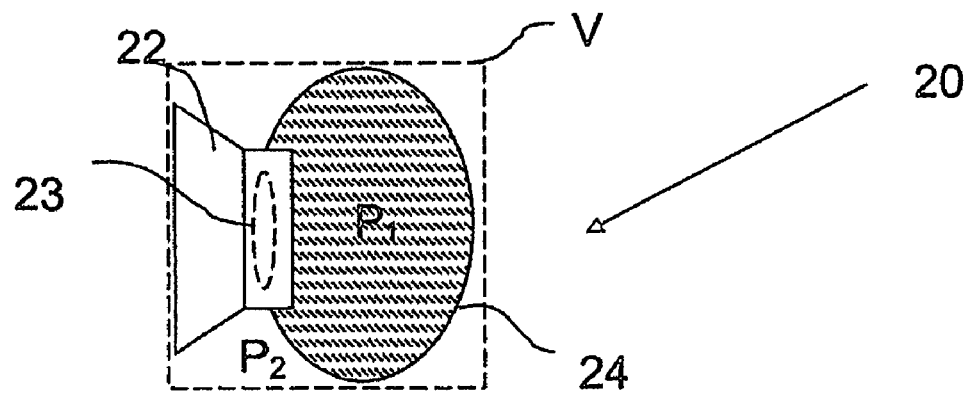

The electro-acoustic communications unit according to the first embodiment of the present invention is schematically shown in FIG. 3. The unit 20 is provided with an acoustic driver in the form of an ordinary electromagnetic loudspeaker 22, the back side of which is directly attached to a hermetically sealed container 24 having an elastic, deformable and flexible wall. The container may therefore be stretched and deformed. The speaker 22 has an acoustic signal generating element in the form of a membrane 23 (shown as a dashed ellipse). The container is made of an elastic material, such as rubber, and is non-permeable for gas. One side of the membrane 23 of the speaker 22 is here directly attached to this rubber container 24, while the other side faces the sound opening of the casing. For illustrative purposes, an enclosing volume V is indicated with a dashed box. The enclosing volume V is in reality made up of the elements of the phone that surround the electro-acoustic communications unit 20, like parts of the casing, the circuit board, components on the circuit board, the display, an antenna, an antenna connector, etc.

The container 24 furthermore contains a gas $P_1$ which is different than the gas $P_2$ surrounding the container. The surrounding gas $P_2$ is here air. Because of the non-permeable nature of the container wall, the gas $P_1$ cannot escape from the container 24.

When the electro-acoustic communications unit 20 according to this first embodiment is mounted into the phone, the elastic wall adapts to the volume V. The shape of the wall is thus determined by this volume V. The container 24 thus adapts in shape to the surrounding area where it is mounted in order to as effectively as possible provide a back volume for the speaker 22.

The gas $P_1$ of the speaker may be lighter than air, preferably helium. When the speaker 22 is operated, the membrane of the speaker emits sound into the air from the front side. However, the back side emits sound into the the helium filled back volume defined by the container 24. This gas, that is "softer" and less dense than air, gives a good balance to the speaker and also ensures larger strokes for the membrane 23, and thus the possibility of providing a higher sound volume.

The gas $P_1$ may be also be heavier than air $P_2$. In this case, the gas $P_1$ provides a stiffer suspension of the speaker element, which lowers distortion that occurs at the resonance frequency of the speaker 22. It also balances the speaker better so that rocking mode distortion phenomena are less likely to occur.

Figure 4:
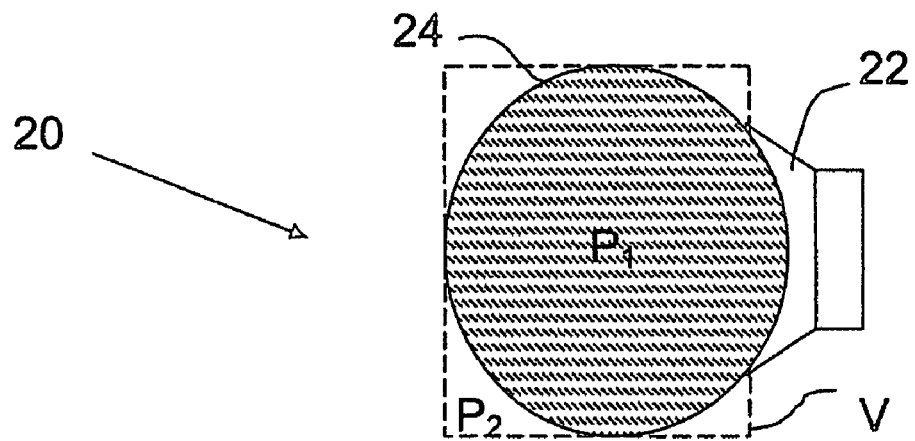

In FIG. 4, there is schematically shown a second embodiment of the electro-acoustic communications unit 20 according to the invention. Here the container 24 is connected to the front side of the speaker 22. In this embodiment the speaker is supposed to have its back side facing outwards towards the casing and its front side facing inwards into the phone. As is well known within the field, a speaker operates equally well on both sides. In this embodiment the container wall is furthermore also a part of the membrane of the speaker, which means that a part of the container wall actually is a membrane of the speaker. This has the advantage of allowing a simpler manufacturing of the electro-acoustic communications unit 20 because the speaker membrane 23 and the container 24 may be provided in one piece of the same material.

Figure 5:
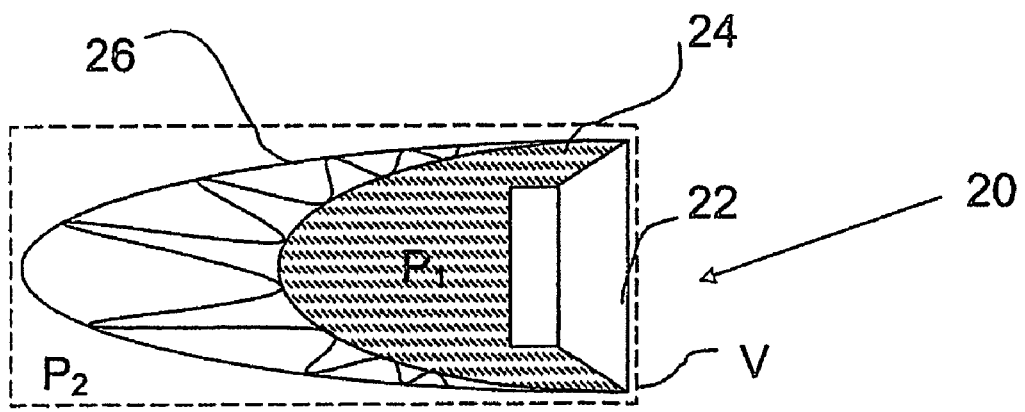

FIG. 5 schematically shows a third embodiment of the electro-acoustic communications unit 20 according to the present invention. In this embodiment, which has the same relationship between speaker 22 and container 24 as the first embodiment, there is furthermore provided an absorbent 26, which may be a porous fiber material, such as, for example, Rockwool, which acoustically acts as a spring. The material 26 may cover the entire container 24 except for the parts connected to the speaker 22. This material holds the container 24 in the place that has been reserved for it. The absorbent 26 also allows the back volume to be better defined and thus the strokes of the speaker 22 may be controlled better than without it.

It is emphasized that this invention can be varied in many more ways, than the ones described above. It is for instance possible to equip the container with more walls and also provide these walls as rigid walls. The container need not be made of rubber but can be made of a suitable plastic material instead. Hence the present invention is only to be limited by the following claims.

What is claimed is:

1. An electro-acoustic communications unit, for mounting in a cellular phone, comprising:
    an acoustic driver which, when operated, emits acoustic waves in two directions; and
    a hermetically sealed, flexible container directly attached to the acoustic driver and comprising a gas other than air, which gas transports acoustic waves generated by the acoustic driver, wherein a portion of the hermetically sealed container forms a membrane of an acoustic signal generating element of the acoustic driver.

2. The electro-acoustic communications unit according to claim 1, wherein the hermetically sealed container is a single flexible wall, the shape of which will be determined at least partly by elements in the interior of the cellular phone.

3. An electro-acoustic communications unit for mounting in a cellular phone, comprising:
    an acoustic driver which, when operated, emits acoustic waves in two directions; and
    a hermetically sealed, flexible container directly attached to the acoustic driver and comprising a gas other than air, which gas transports acoustic waves generated by the acoustic driver, wherein the acoustic driver comprises an acoustic signal generating element that includes a first side of a membrane and a second side of a membrane, where the second side of the membrane is directly attached to the hermetically sealed container.

4. The electro-acoustic communications unit according to claim 1, further comprising an absorbent covering the hermetically sealed container, except for parts connected to or being part of the acoustic driver.

5. The electro-acoustic communications unit according to claim 1, wherein the gas is lighter than air.

6. The electro-acoustic communications unit according to claim 5, wherein the gas is helium.

7. The electro-acoustic communications unit according to claim 1, wherein the gas is heavier than air.

8. The electro-acoustic communications unit according to claim 1, wherein the container is made of rubber.

9. A portable electronic device comprising an electro-acoustic communications unit comprising:
    an acoustic driver which, when operated, emits acoustic waves in two directions; and
    a hermetically sealed, flexible container directly attached to the acoustic driver and comprising a gas other than air, wherein the gas transports acoustic waves generated by the acoustic driver, wherein the acoustic driver comprises an acoustic signal generating element that includes a first side of a membrane and a second side of a membrane, where the second side of the membrane is directly attached to the hermetically sealed container.

10. The portable electronic device according to claim 9, wherein the hermetically sealed container is a single flexible wall, the shape of which is determined at least partly by elements in the interior of the portable electronic device.

11. A portable electronic device comprising an electro-acoustic communications unit comprising:
    an acoustic driver which, when operated, emits acoustic waves in two directions; and
    a hermetically sealed, flexible container directly attached to the acoustic driver and comprising a gas other than air, wherein the gas transports acoustic waves generated by the acoustic driver, wherein a portion of the hermetically sealed container forms a membrane of an acoustic signal generating element of the acoustic driver.

12. The portable electronic device according to claim 9, further comprising an absorbent covering the entire hermetically sealed container, except for parts connected to or being part of the acoustic driver.

13. The portable electronic device according to claim 9, wherein the gas is lighter than air.

14. The portable electronic device according to claim 12, wherein the gas is helium.

15. The portable electronic device according to claim 9, wherein the gas is heavier than air.

16. The portable electronic device according to claim 9, wherein the container is made of rubber.

17. The portable electronic device, according to claim 9, wherein the portable electronic device is a portable communication device.

18. The portable electronic device, according to claim 17, wherein the portable electronic device is a cellular phone.

* * * * *